US011126257B2

(12) United States Patent
Stent (10) Patent No.: US 11,126,257 B2
(45) Date of Patent: Sep. 21, 2021

(54) SYSTEM AND METHOD FOR DETECTING HUMAN GAZE AND GESTURE IN UNCONSTRAINED ENVIRONMENTS

(71) Applicant: TOYOTA RESEARCH INSTITUTE, INC., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 144 days.

(21) Appl. No.: 15/955,333

(22) Filed: Apr. 17, 2018

(65) Prior Publication Data

US 2019/0317594 A1 Oct. 17, 2019

(51) Int. Cl.
*G06K 9/00* (2006.01)
*G06F 3/01* (2006.01)
*G06K 9/46* (2006.01)
*G06T 7/55* (2017.01)

(52) U.S. Cl.
CPC .............. *G06F 3/013* (2013.01); *G06F 3/017* (2013.01); *G06K 9/4671* (2013.01); *G06T 7/55* (2017.01); *G06F 2203/0381* (2013.01)

(58) Field of Classification Search
CPC .......... G06F 3/013; G06F 3/017; G06T 7/55; G06K 9/4671
USPC ........................................................ 382/103
See application file for complete search history.

(56) References Cited

U.S. PATENT DOCUMENTS 9,285,874 B2 3/2016 Bychkov et al.
10,027,888 B1* 7/2018 Mackraz ............ G06K 9/00228
2005/0004710 A1* 1/2005 Shimomura ....... G06K 9/00281
700/246
2005/0286739 A1* 12/2005 Pilu ..................... G06K 9/00624
382/103
2008/0089556 A1* 4/2008 Salgian .................. G06K 9/209
382/103
2011/0043522 A1* 2/2011 Zhou ..................... G06T 15/506
345/426

(Continued)

FOREIGN PATENT DOCUMENTS

WO 2016095057 A1 6/2016
WO 2016174659 A1 11/2016

OTHER PUBLICATIONS

"Experiential Study Report on Opto-Electronic Sensor Based Gaze Tracker System," Sree, et al., 2011 International Conference on Emerging Trends in Electrical and Computer Technology (ICETECT), Mar. 24, 2011.

*Primary Examiner* — Stephen P Coleman
(74) *Attorney, Agent, or Firm* — Seyfarth Shaw LLP; George Haight (57) ABSTRACT

A system for gaze and gesture detection in unconstrained environments includes a 360-degree (omnidirectional) camera system, one or more depth sensors, and associated memory, processors and programming instructions to determine an object of a human user's attention in the unconstrained environment. The illustrative system may identify the object using eye gaze, gesture detection, and/or speech recognition. The system may generate a saliency map and identify areas of interest. A directionality vector may be projected on the saliency map to find intersecting areas of interest. The system may identify the object of attention once the object of attention is located.

11 Claims, 6 Drawing Sheets

(56) References Cited

U.S. PATENT DOCUMENTS

| | | | |
|---|---|---|---|
| 2012/0163625 A1* | 6/2012 | Siotis | H04R 3/005 |
| | | | 381/92 |
| 2013/0187835 A1* | 7/2013 | Vaught | G06F 3/013 |
| | | | 345/8 |
| 2014/0204019 A1* | 7/2014 | Kihara | G06F 1/3231 |
| | | | 345/156 |
| 2017/0177937 A1* | 6/2017 | Harmsen | G06T 7/579 |
| 2017/0263017 A1 | 9/2017 | Wang et al. | |
| 2018/0013633 A1* | 1/2018 | Daijavad | G06Q 10/0637 |
| 2018/0288477 A1* | 10/2018 | Gupta | G06F 3/0482 |

* cited by examiner

SYSTEM AND METHOD FOR DETECTING HUMAN GAZE AND GESTURE IN UNCONSTRAINED ENVIRONMENTS

FIELD OF TECHNOLOGY

The present disclosure relates generally to detection of human movement, and more specifically, detection of human eye gaze or gesture movement by an intelligent machine in an unconstrained environment.

BACKGROUND

Machine detection of human movement has become prevalent with the advancement of interactive computers, machine learning, and artificial intelligence. Desktop computers, smartphones, tablets, video game systems, and other devices with integrated or peripheral cameras may include the ability to detect human movement and even the user's gaze (e.g., the direction a user's eyes are looking).

Known gesture control and gaze tracking systems rely on narrow vision cameras and are designed for environments where a user's motion is in some way constrained (e.g., estimating the gaze of a driver, or a person in front of a computer screen). These systems neither allow free movement of the user, nor are able, in most cases, to observe the same environment that the user observes. In more general environments, where a user may instruct a robot to engage (e.g., to move or deliver) an object among other objects in the space, these systems are not useful and are also are not able to understand what the user is looking at or pointing to since the object of attention is typically not in the view of the camera.

SUMMARY

Embodiments of the present disclosure include a system for gaze and gesture detection in unconstrained environments. The system may include an image capturing device configured to generate a 360-degree image of an unconstrained environment comprising an individual and an object of interest. The system may further include a depth sensor configured to generate a three dimensional depth map of the unconstrained environment and a knowledge base. A processor may be included that is configured to generate an environment map from the 360-degree image and the depth map and determine a direction of attention from the individual in the 360-degree image. The processor may be further configured to generate a directionality vector representative of the direction of attention and project the directionality vector from the individual on the environment map. The processor may also be configured to detect an intersection of the directionality vector with the object of interest and search the knowledge base for the identity of the object of interest using data relating to the object of interest.

Additional features of the system may include a monocular panoramic camera as the image capturing device. Alternatively, the 360-degree image may be several images stitched together. The processor may be configured to determine the direction of attention from at least one of an eye gaze, gesturing direction of the individual, or a combination thereof. The depth sensor may be one of an infrared sensor, a neural network trained for depth estimation, or a simultaneous localization and mapping sensor.

In a further embodiment of the present disclosure a method for locating and identifying an object is disclosed. The method may include capturing a 360-degree image of an unconstrained environment comprising an individual and an object of interest and generating an environment map. A direction of attention may be determined from the individual in the captured 360-degree image and a directionality vector representative of the direction of attention may be generated. The directionality vector may be projected from the individual on the environment map and an intersection of the directionality vector with the object of interest may be detected.

Additional features of the system and methods may include searching a knowledge base for an identity of the object of interest and initiating a learning process when the identity of the object of interest is not found in the knowledge base. The learning process may be a neural network. The environment map may be generated by obtaining environment depth information and combining the depth information with the 360-degree image. Depth information may be obtained from an infrared sensor, simultaneous localization and mapping process or from a neural network. The environment map may be a saliency map and/or may include a semantic parsing of the environment. The system and method may further estimate an eye gaze and/or a gesturing direction of the individual, The direction of attention may be determined by the eye gaze and/or the gesture. The eye gaze may be obtained using infrared sensors.

Another embodiment of the present disclosure may include a system for locating and identifying an object. The system may include a monocular camera configured to capture a 360-degree image of an unconstrained environment including an individual and an object of interest. An infrared depth sensor may be configured to generate a 3D depth map of the unconstrained environment. The system may further include a knowledge base and a processor. The processor may be configured to generate a saliency map from the 360-degree image and the depth map, and determine a direction of attention from the individual. The processor may further generate a three-dimensional directionality vector representative of the direction of attention and project the three-dimensional directionality vector from the individual on the environment map. The processor may also detect an intersection of the three-dimensional directionality vector with the object of interest and search the knowledge base for the identity of the object of interest using captured image data relating to the object of interest.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which.

DETAILED DESCRIPTION

The present disclosure describes systems and methods for estimating and tracking human gaze and gestures to predict, locate, and identify an object in an unconstrained environment. The system may rely on advanced imaging techniques, machine learning, and artificial intelligence, to identify an object and its location based on interpretation of a human gesture, eye gaze, recognized speech, or any combination thereof. Embodiments of the disclosure will now be described more fully hereinafter with reference to the accompanying figures. The foregoing may, however, be embodied in many different forms and should not be construed as limited to the illustrated embodiments set forth herein.

The present disclosure provides systems and methods to capture a human gaze or gesture as well as the environment around the individual to locate and identify an object. According to one embodiment, a 360-degree monocular camera may produce a 360-degree two-dimensional ("2D") image of an unconstrained environment. One or more infrared depth sensors may be used to create a depth map to enhance the scene capture to provide depth estimation parameters of the individuals or objects in the unconstrained environment.

A system may process the 2D image and depth map to determine a three-dimensional ("3D") vector indicating a gaze and/or gesture, such as a pointing direction, of the individual. The system may generate a saliency map to define likely areas of attention in the scene. The saliency map may provide a technical advantage in predicting with greater accuracy the object or location to which an individual is gazing or gesturing. The 3D vector may be projected onto the observed environment image to determine if the 3D vector intersects with any objects and locations identified in the environment of the individual. Once the system locates and identifies an object with sufficient certainty, the system may further interact with the object. If an object is located, but is unknown to the system, a machine learning process may be initiated to further educate the system and expand the system's knowledge base.

Figure 1:
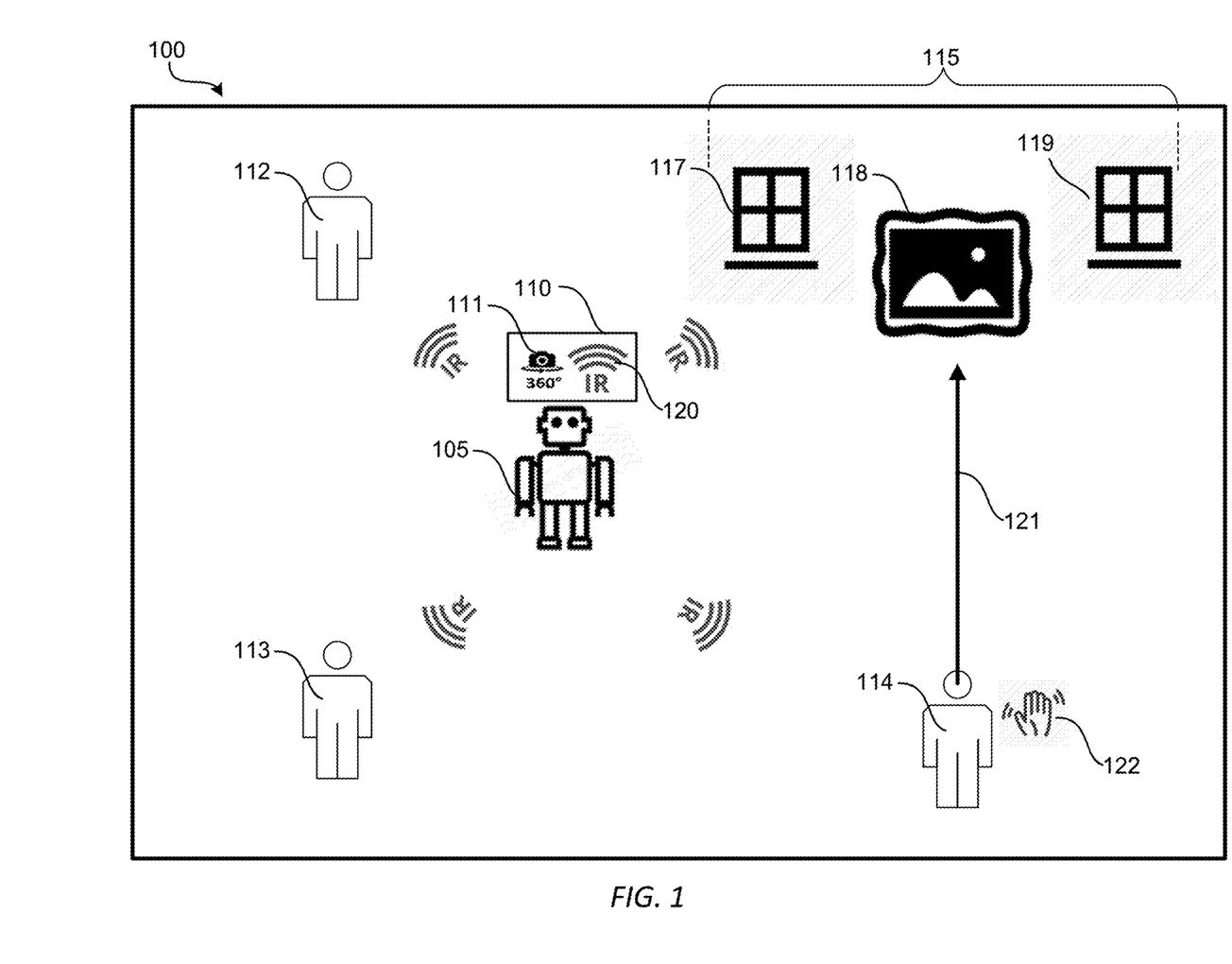
FIG. 1 is a conceptual diagram of an unconstrained environment illustrating a context for implementing a system and method for detecting a human eye gaze and/or gesture movement by an intelligent machine according to an embodiment of the disclosure.

FIG. 1 is a conceptual diagram illustrating an unconstrained environment 100 or context for implementing the system and method for detecting a human eye gaze and/or gesture movement by an intelligent machine according to an embodiment of the disclosure. A gaze and gesture detection system may be embodied in a computing machine, such as a robot 105 equipped with an image capturing device 110. The environment 100 may include one or more individuals 112, 113, 114 and multiple objects 115. One directing individual 114, in particular, may be looking at or gesturing towards one of the multiple objects 115. The image capturing device 110 may capture the gaze direction 121 of the individual 114. The image capturing device also may capture or detect a gesture 122 performed by the directing individual 114. The gesture detection information may be used to compliment or confirm the direction of the directing individual's 114 attention. For example, as shown in FIG. 1, the multiple objects 115 in the unconstrained environment 100 may include a first window 117, second window 119, and a painting 118 located between the two windows 117, 119. The painting 118 may be hung on a wall in the unconstrained environment 100 or may be placed on a stand or easel.

As used herein, the term "unconstrained environment" may include any space in which an individual's movements or actions are not limited by a spatial field-of-view of a camera or image capturing device 110. In contrast to a driver constrained to an automobile seat, or a computer user constrained to an area immediately in front of a computer camera's field-of-view, an individual in an exemplary unconstrained environment 100 may move freely about the area and still be within a field-of-view of the image capturing device 110.

The computing machine, or robot 105, may include a 360-degree, monocular camera 111 as the image capturing device 110, or a component thereof. The use of a 360-degree, monocular camera 111 provides a substantially complete field-of view of the unconstrained environment 100. Therefore, regardless of a location of the individuals 112, 113, 114 or the multiple objects 115, the individuals 112, 113, 114 or the objects 115 may be captured by the camera 111. As such, the individuals 112, 113, 114 and the robot 105 may move within the environment 100 and the camera 111 may still capture the individuals 112, 113, 114 and multiple objects 115 within the unconstrained environment 100.

The system may further include additional environment data gathering capabilities to gather depth information within the unconstrained environment 100. The system may generate a depth map by capturing environment information relating to the multiple objects 115, individuals 112, 113, 114, and environment contours, such as walls, columns, and other structures. The robot 105 and the image capturing device 110 may include one or more infrared ("IR") sensors 120 to scan or image the environment 100. Furthermore, the robot 105 and the image capturing device 110 may use the displacement of the IR signals to generate a depth image, which may be used by the system to estimate the depth of objects or individuals in the environment from the image capturing device 110.

If the robot 105, or other computing machine is a moving robot, environment depth information may be obtained using simultaneous localization and mapping ("SLAM") techniques. SLAM techniques provide a process by which a map of an unknown environment may be built by a moving robot that may also simultaneously navigate the environment. In one configuration, the SLAM technique may use features extracted from the imaging devices to estimate the robot's location within the unconstrained environment. This may be done while mapping the environment for the robot 105 such that the robot 105 is aware of the relative 3D position of objects in the environment. This may include objects which the robot 105 has observed in the past, but which are presently occluded by other objects or scene structure.

According to one embodiment of the present disclosure, the environment depth information may be generated using an artificial neural network trained for depth estimation in unconstrained environments, such as the unconstrained environment of FIG. 1. The artificial neural network may generate environment depth information alternatively from, or in addition to, the methods and systems discussed above. In one configuration, the artificial neural network may be trained using object information. Based on the system having no a priori information regarding the objects or its environment, the artificial neural network may independently develop its own defining characteristics regarding each object or individual in the environment.

The artificial neural network may be trained for one or more specific tasks. The tasks may include, without limitation, person detection, body pose estimation, face detection, object instance segmentation, recognition and pose estimation, the estimation of metric scene depth, and the segmentation of the scene into further attributes such as material properties and adjectival descriptions. The system may observe novel objects or structure which the system is unable to confidently recognize or segment. In such a case, the system may be able to independently develop its own defining characteristics regarding each object using extracted attributes and depth.

In addition to mapping the contours, objects, and individuals of the unconstrained environment 100, the system may also include the capability to capture or detect eye gaze information of the directing individual 114. Eye gaze information may be obtained using the IR sensors, an RGB camera, and/or one or more optical tracking devices in communication with the robot 105. As an example, IR light may transmitted by the IR sensors 120 and reflected from the eye of the gesturing individual 114. The reflected IR light may be sensed by a camera or optical sensor. As explained below, in a further refinement, eye gaze data may be observed over a period of time, using multiple images, scans or the like, to further develop the gazing direction or objects of interest in the area of the gaze.

The image information is then analyzed by a processor to extract eye rotation from changes in reflections. The processor may use the corneal reflection and the center of the pupil as features to track over time. Alternatively, reflections from the front of the cornea and the back of the lens may be the features tracked. Using the IR images of the eye of the gesturing individual 114, either as part of the depth map or imaged and processed independently, the system may determine a direction of the individual's gaze. As discussed below, the system may extrapolate a line-of-sight from the individual across the environment image map in search of an intersection of the projected line-of-sight and an object of interest.

In addition to observing and capturing the location and eye position of an individual, the system may further detect a gesture 122 (e.g., pointing posture) of the directing individual 114. The gesture 122 may be used to identify, assist in identifying, or confirming the directionality of the directing individual's 114 attention. As described below, the system may detect an extended arm or hand. Based on an angle between the gesturing arm and the body of the directing individual 114, the system may extrapolate a line or vector of directionality through the unconstrained environment 100.

Figure 2A:
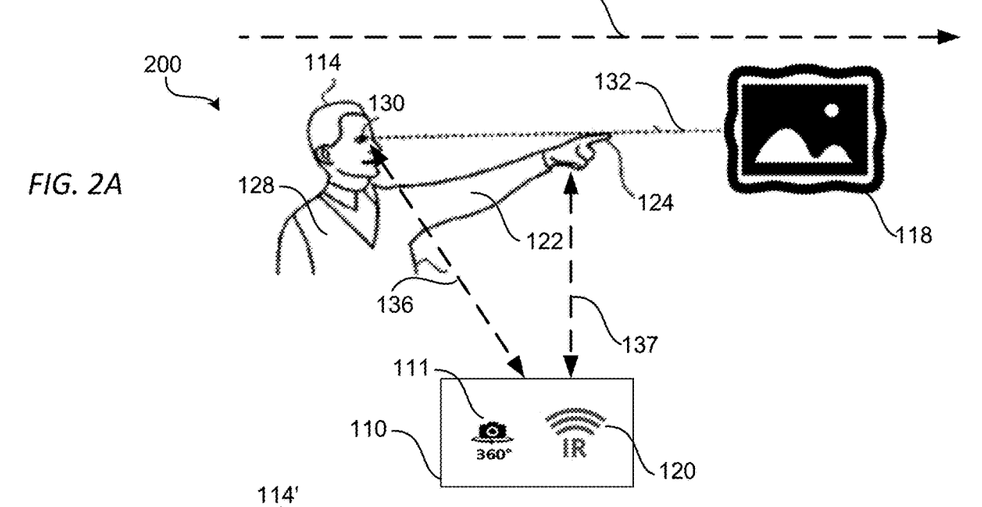
FIGS. 2A-B depict a conceptual diagram of an image capturing device observing a gesture of an individual according to an embodiment of the present disclosure.

FIG. 2A illustrates an example of a conceptual diagram 200 of an image capturing device 110 observing an eye gaze 130 of a directing individual 114. In addition to detecting the eye gaze 130, the image capturing device 110 may identify a pointing direction 124, or other directional gesture from the directing individual 114 to triangulate a location or object of interest to the directing individual 114. The system may analyze the image map from the IR sensors 120 or the 360-degree monocular camera 111. Based on the analysis, the system may apply a pattern or shape recognition process to identify the directing individual 114 and the pointing direction 124.

The directing individual 114, eye gaze 130, and gesture 122 may be used to extrapolate a direction of attention 126 from the gesturing individual 114. The system may detect both the eye gaze 130 and the gesture 122 of the directing individual 114. The system may identify an extended arm or appendage extending away from a larger mass, such as a body 128 of the directing individual 114. Data from the eye gaze direction and the gesturing direction may be combined. The system may use the distances 136, 137 from the image capturing device 110 to the directing individual 114 and to the end of the pointing direction 124 to determine the directionality vector 132. As shown in the example of FIG. 2A, a directionality vector 132 may be extrapolated in a direction from the eye of the individual 114 through the gesture 122. Using the image map, the system may determine that the directionality vector 132 intersects the object of attention, such as the painting 118. The object of attention may be identified based on the intersection of the directionality vector 132 and the object of attention.

Figure 2B:
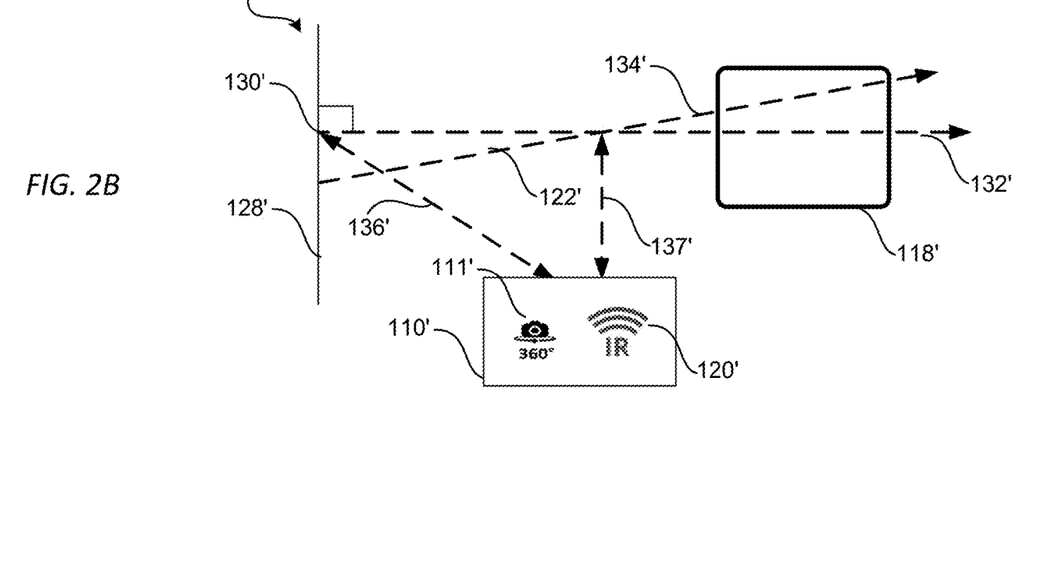

FIG. 2B depicts the diagram of FIG. 2A, as may be interpreted by the system. As shown in FIG. 2B, the system may analyze an image map from the IR sensors 120' or the 360-degree monocular camera 111'. The directionality vector 132' may be estimated, for example, by triangulating a body 128' of the directing individual 114', an eye gaze line-of-sight 130' and a gesture 122'. The system may estimate the directionality vector 132' using the distances 136', 137' from the image capture device 110' to the eye of the gesturing individual 114' and the intersection of the eye gaze line-of-sight 130' with the gesture 122'. The directionality vector 132' may be extended along the eye gaze line-of-sight 130' to the intersection with the object of interest 118' (e.g., the painting 118). While the illustrated example of FIGS. 2A-2B may use both eye gaze and gesture recognition together, the system may still locate and identify an object of interest using eye gaze alone, or it may use the gesturing information to supplement or confirm the accuracy of the gaze detection. Gesture information alone may also be used. For example, using only the gesture 122' and extrapolating a gesture vector 134' from the individual 114' solely in the direction of the gesture 122', the gesture vector 134' still intersects with the object of interest 118'.

Figure 3A:
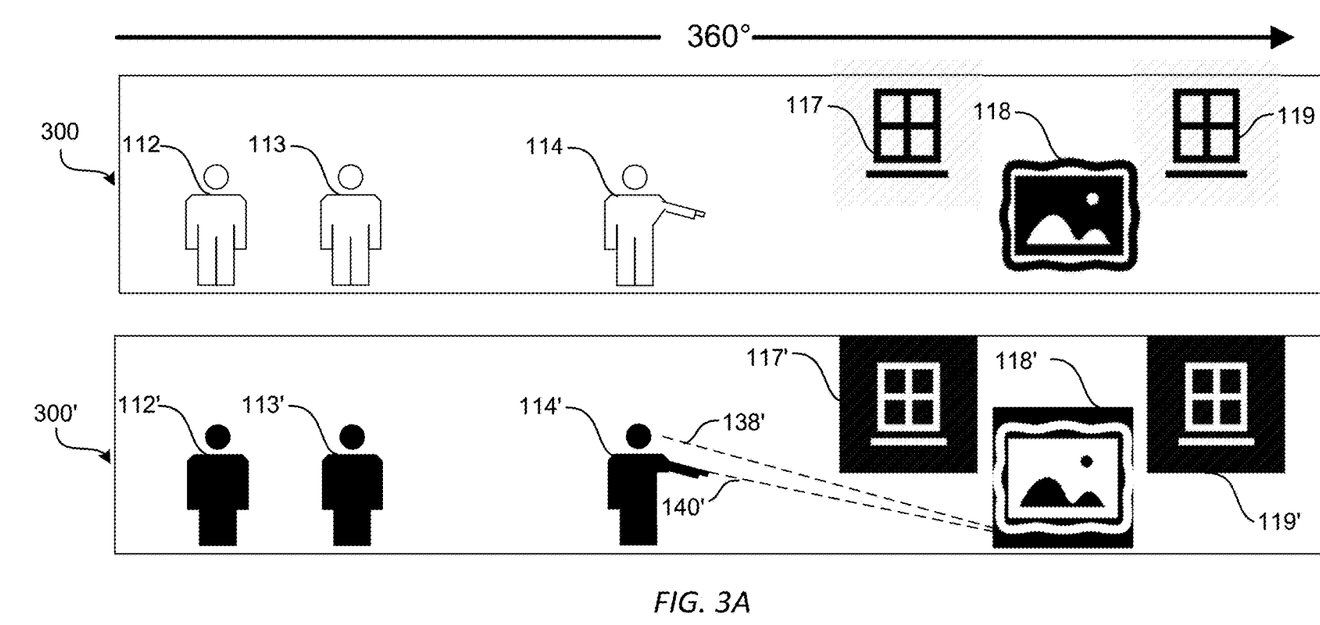
FIG. 3A is a conceptual diagram of a 360-degree, panoramic image and a resulting saliency map generated by the system based on the 2D image and depth sensing data according to an embodiment of the present disclosure.

The system may generate a saliency map to define likely areas of attention in a scene. The system may analyze the image and depth map to generate and project a 3D vector indicating the gaze and/or gesturing direction of the individual onto the saliency map. FIG. 3A is a conceptual diagram of a 360-degree panoramic image 300 and a saliency map 300' generated by the system based on a 2D image and depth sensing data. The panoramic image 300 may be a 2D image. In this example, the panoramic image 300 depicts the individuals 112, 113, 114, windows 117, 119, and painting 118 linearly as an image capturing device scans the environment.

The saliency map 300' may be based on the 360-degree panoramic image 300 and an IR depth map. As previously discussed, the IR depth map may be obtained by the image capturing device and IR sensors. The saliency map 300' may be a topographically arranged map that represents the visual saliency of a corresponding visual scene, such as the 360-degree image of an unconstrained environment. Image data and depth sensory data may be combined to form the saliency map 300'. The saliency map 300' may identify areas of interest in the environment. The system may identify individuals 112', 113', 114', objects 117', 119' (e.g., windows 117, 119) and an object of interest 118' (e.g., painting 118) as areas of interest. For illustrative purposes, the areas or objects of interest in the saliency map 300' are depicted in opposite contrast to the panoramic image 300. The system may determine these objects and individuals as being of interest due to the differentiation of surrounding areas and known areas of dis-interest.

For example, the system may be more interested in distinguishable objects within the environment in comparison to walls, floors, and/or other locations that are seen as large areas of continuous image data. Areas of low interest, such as walls and/or floors, may be identified as such due to the continuous and homogenous pixel data spanning a large area within the environment. Individuals and objects may be identified as objects of interest due to the differing and contrasting pixel data identified based on a comparison with the pixel data of surrounding areas. The system may analyze the saliency map 300', together with gaze and/or gesture information, to identify the object or location of the individual's attention.

A 3D directionality vector 138' may be generated by the system and projected on the saliency map 300'. The directionality vector 138' may be projected onto the rest of the observed scene, including any uncertainty bounds. When data is visualized to a 3D model, uncertainty may exist in the data due to noise and other factors. Uncertainty data may be provided along with the other data to indicate the level of uncertainty (e.g., fidelity) of the data. Uncertainty bounds may be estimated by the gaze detection system based on the view or relative pose of the person. For example, if the person is looking away from the camera, the uncertainty bounds may be large due to the lack of a direct line-of sight between the camera and the individual's eyes. On the other hand, if the person is close to the camera and fronto-parallel, the uncertainty bounds may be smaller. The uncertainty bounds may effectively turn the estimated 3D vectors into cones, with the apex at the eyeball.

Gesture detection and related information may be used to narrow the uncertainty bounds. For example, if the directing individual is facing away from the camera, such that the individual's eyes are undetectable by the system, the gesturing detection and information may be used to supplement the analysis to locate and identify the object of interest. The system may be able to generate a wide cone of attention based on the direction of the individuals head, facing away from the camera. If a gesture is detected, the system may generate a gesturing cone of attention, based on the detected directionality of the gesture. The system may then determine an intersection or overlap of the gaze cone of attention with the gesturing cone of attention. The intersection of the two cones of attention may provide a narrower 3D vector cone within which the system can locate and identify potential objects of attention.

As previously discussed, the system may determine a distance from the image capturing device to the directing individual 114', using the depth map data. Based on the determined distance, the system may project the directionality vector 138' from the location of the gesturing individual 114' in the direction of the detected gaze or gesture to identify an intersection with an object of interest 118'. In the example of FIG. 3, the system may identify the object of interest 118' in the path of the directionality vector 138'. Thus, the system may identify the object of interest 118' as the object of attention of the gesturing individual 114' based on the intersection with the directionality vector 138'.

As described above, gesture information may be observed by the system and used to help the system locate and identify the object of interest 118'. A gesturing vector 140' may be generated using the information from the saliency map 300'. The gesturing vector 140' may be based on the angle of the gesturing arm from the body of the individual 114' and extrapolated in a direction through the saliency map 300'. As shown in FIG. 3, the gesturing vector 140' may still intersect with the same object of interest 118'. To improve accuracy and certainty, the system may use both eye gaze and gesturing vectors to triangulate or otherwise detect intersections with objects of interest.

In a further effort to reduce uncertainty, the system may refine the eye gaze detection by generating a heat map combining discrete snapshots of the directing individual's eye gaze over a period of time. Not only is the human eye always in motion, but the attention of the directing individual may vary. For example, the directing individual may momentarily gaze back to the robot, to another individual, or to another portion of the object of interest. A single image capture of the directing individual's eye may not be sufficient or accurate enough to identify the correct object of attention.

Figure 3B:
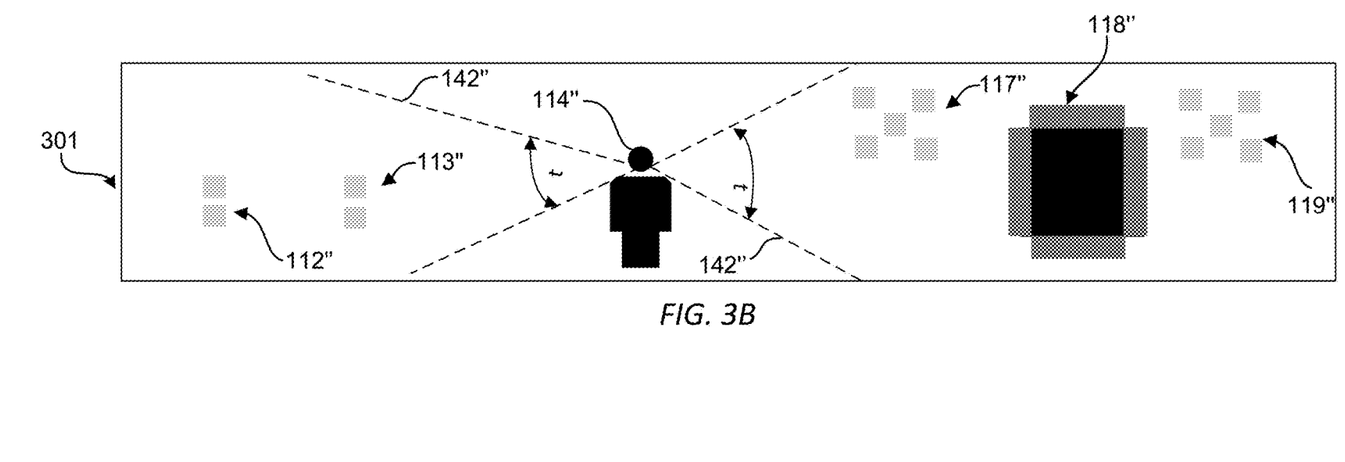
FIG. 3B is a conceptual diagram of a heat map according to an embodiment of the present disclosure.

FIG. 3B is a conceptual diagram of a heat map 301 according to one embodiment of the disclosure. The use of a heat map 301 that incorporates one or more images or scans of the directing individual's eye gaze over a period of time can provide an additional level of accuracy. The heat map 301 may be formed by combining data from a series of eye gaze images or scans, taken over time, t, depicted in FIG. 3B as gaze ranges 142" to identify the areas to which the directing individual is gazing with the highest frequency. The areas 112", 113", 117", 118", 119" depicted in FIG. 3B represent the density and/or frequency of image scans in which the directing individual may be determined to be gazing to that particular area. The system may estimate that, over the given scan period, t, the directing individual 114" gazed at one area 118" at a higher frequency than other areas within the environment. According to the illustrative heat map 301, the highest number of eye gaze scans may indicate an area of interest 118" based on the density of scans.

Less frequent areas of interest may be detected at the adjacent areas 117", 119" (representative of the windows 117 and 119, respectively). Areas 112", 113", indicative of the other individuals 112, 113 in the environment may also be shown with a lower frequency of scan data. The lower frequency areas identified in the heat map may indicate that the directing individual 114" glanced momentarily at the windows and other individuals in the environment during the period, t. It should be appreciated that the representation of the directing individual 114" in FIG. 3B is provided merely for illustrative purposes to provide additional context and a frame of reference. It would be unlikely that the directing individual would gaze at himself during the period, t, in which the system was gathering eye gaze data.

The heat map 301 may be combined with a saliency map to determine an intersection of the areas of interest in the heat map with the objects identified in the saliency map. The system may have identified where the objects in the environment are physically located (i.e., the saliency map) and determined where the directing individual is gazing, or gesturing (i.e., the heat map). Combining the two sets of data may indicate with a level of certainty the location of an object of interest.

Once the system has identified the object of interest, using any of the methodologies described above, the system may determine an identity of the identified object. The system may use the image and depth data obtained by the image capturing device to search a knowledge base (e.g., by using the feature representations provided by a neural network) to associate the identified object of interest 118' with a similar object in the knowledge base. If a match is made within a degree of certainty, the system may associate the identified object of interest 118' with the matching object.

If, however, the object of interest is not matched, the system may begin a learning process to identify the object's identity. For example, the system may indicate that the identified object of interest is unknown and prompt the directing individual, or other operator, for information. System prompts may include audio or visual prompts, or any other input-seeking request through which the system may obtain information regarding the identity of the object of interest. The system may use machine learning techniques and a user input to associate the image data relating to the object to an identity of a known object, such that the object of interest (e.g., a painting) and objects observed having similar image data, may be known to the system.

The system may use user input to provide identification information to the knowledge base. For example, the system may use voice recognition and natural language understanding to obtain object names and other information from the user input. For example, if the system cannot identify the object in the knowledge base, the system may output an audio or visual prompt for identifying information. In response to the prompt, an individual may verbally identify the object by name. The system may record an audio signal of the individual's verbal identification, and process the audio signal using a natural language processor to parse and convert the audio to machine-understandable text. The system may then associate and correlate the identification information with the image data and store the association in the knowledge base for future recall. Furthermore, the system may record additional information regarding the object, such as the object's location relative to the environment, the object's proximity to other similar or distinguishable objects, or the like. The additional data gathered may assist the system during future inquiries or processing of objects in the environment.

The system may also learn or be programmed with a library of commands, objects and affordances for each object. Affordances may include a variety of transactions that are possible between an individual, or machine, and their environment. The system may, upon learning the identity of an object, associate the object with a set of affordances that provide additional context for how the system will locate, identify, and interact with the given object. For example, if the system is trained to recognize a table, certain affordances may be associated with that object for future interaction. Given the object's identity of a table, the system may associate certain characteristics with the object. Exemplary properties may include, without limitation, a flat surface on which items can be placed, a surface elevated above a floor, or the like. Thus, future interactions from directing individual may instruct the system to locate an object "on the table." The system may recognize the identity of the table and extract the associated properties and know that the table includes a surface, elevated above the ground.

Such affordances, and object-associated properties may then be used to further filter the environment information, such that the system may first seek to identify a table, and then, in the narrower environment of the table (and its surface), locate the requested object. The association of objects with their properties and characteristics may be accomplished during training, semantic scene parsing or other machine learning stages as described herein.

Figure 4:
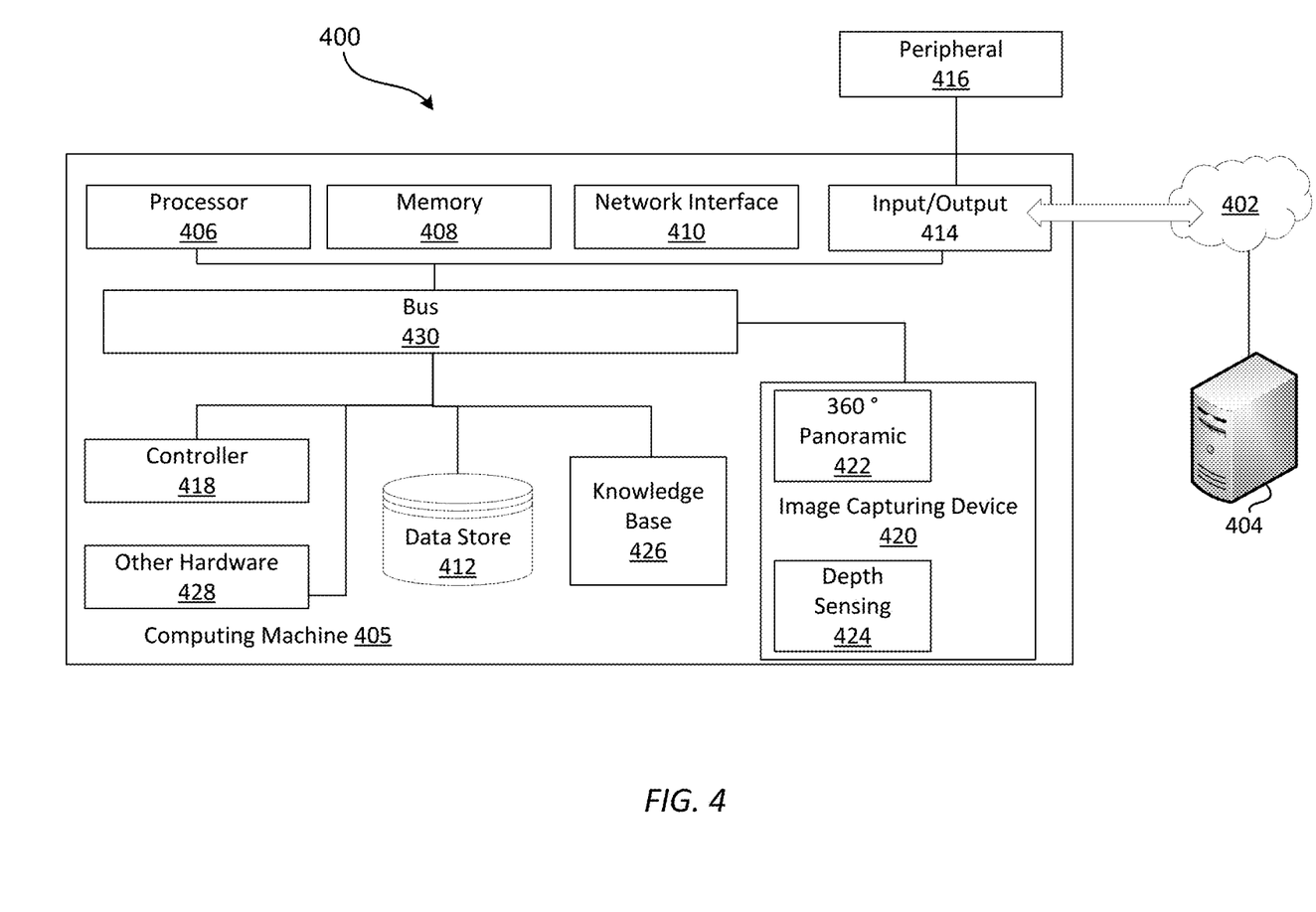
FIG. 4 illustrates a system for detecting a human eye gaze and/or gesture movement according to an embodiment of the present disclosure.

Turning now to FIG. 4, a system 400, according to an embodiment of the disclosure, is shown. The system 400 may include a specialized computing machine 405. As detailed above, the computing machine 405 may be implemented as a moving robot, or may be another consolidated or distributed computing machine, such as a special purpose computer designed and implemented for location and identification of an object of interest using human gaze and gesture detection. The computing machine 405 may include data sources, servers, and/or client devices specifically designed for the systems described herein.

The computing machine 405 may include an interactive robot capable of interacting with humans. The computing machine 405 may also be a device for interacting with other devices or sensors over a network 402, but disposed in an unconstrained environment as described hereinbefore, such as a laptop computer, a desktop computer, a personal digital assistant, a tablet, a mobile phone, a television, a set top box, a wearable computer, and the like. In certain aspects, the computing machine 405 may be implemented using hardware or a combination of software and hardware. The computing machine 405 may be a standalone device, a device integrated into another entity or device, a platform distributed across multiple entities, or a virtualized device executing in a virtualization environment.

The network 402 may include data network(s) or inter-network(s) suitable for communicating data and control information among components in the system 400. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE, MT-Advanced, E-UTRA, etc.), WiMAX-Advanced (IEEE 802.16m), and/or other technologies, as well as any of a variety of corporate area, metropolitan area, campus or other local area networks, or enterprise networks, along with any switches, routers, hubs, gateways, and the like that might be used to carry data among components interoperating as described herein in the computer system 400. The network 402 may also include a combination of data networks, and need not be limited to a strictly public or private network. The system may include an external device 404. The external device 404 may be a computer or other remote resource that connects to the computing machine 405 through the network 402.

In general, the computing machine 405 may include a processor 406, a memory 408, a network interface 410, a data store 412, and one or more input/output interfaces 414. The computing machine 405 may further include or be in communication with wired or wireless peripherals 416, or other external input/output devices, such as remote controls, communication devices, or the like, that might connect to the input/output interfaces 414.

The processor 406 may be a processor or processing circuitry capable of processing instructions for execution within the computing machine 405 or system 400. The processor 406 may include one or more of a single-threaded processor, a multi-threaded processor, a multi-core processor, or the like. The processor 406 may be capable of processing instructions stored in the memory 408 or the data store 412, and providing functionality as described herein. The processor 406 may be a single processor or may include a number of processors working in conjunction with the system 400 and other processors to execute instructions in parallel.

The memory 408 may store information within the computing machine 405. The memory 408 may include volatile or non-volatile memory or other computer-readable medium, including without limitation a random access memory (RAM), a flash memory, a read-only memory (ROM), a programmable read-only memory (PROM), an erasable PROM (EPROM), registers, and so forth. The memory 408 may store program instructions, program data, executables, and other software and data useful for controlling operation of the computing machine 405 and configuring the computing machine 405 to perform functions for a user. The memory 408 may include a number of different stages and types of memory for different aspects of operation of the computing machine 405. For example, a processor may include on-board memory and/or cache for faster access to certain data or instructions, and a separate, main memory or the like may be included to expand memory capacity as desired. All such memory types may be a part of the memory 408 as contemplated herein.

The memory 408 may, in general, include a non-volatile computer readable medium containing computer code that, when executed by the computing machine 405 creates an execution environment for a computer program in question (e.g., code that constitutes processor firmware, a protocol stack, a database management system, an operating system, or a combination of the foregoing) and that performs some or all of the steps described or set forth in the flow chart and/or other algorithmic descriptions set forth herein.

While a single memory 408 is depicted, it will be understood that a number of memories may be usefully incorporated into the computing machine 405. For example, a first memory may provide non-volatile storage such as a disk drive for permanent or long-term storage of files and code even when the computing machine 405 is powered down. A second memory such as a random access memory may provide volatile (but higher speed) memory for storing instructions and data for executing processes. A third memory may be used to improve performance by providing higher speed memory physically adjacent to the processor 406 for registers, caching and so forth.

The network interface 410 may include hardware and/or software for connecting the computing machine 405 in a communicating relationship with other resources through the network 402. This may include remote resources accessible through the Internet, as well as local resources available using short range communications protocols using, for example, physical connections (e.g., Ethernet), radio frequency communications (e.g., Wi-Fi), optical communications, (e.g., fiber optics, infrared, or the like), ultrasonic communications, or a combination of these or other media that might be used to carry data between the computing machine 405 and other devices. The network interface 410 may, for example, include a router, a modem, a network card, an infrared transceiver, a radio frequency (RF) transceiver, a near field communications interface, a radio frequency identification (RFID) tag reader, or any other data reading or writing resource or the like.

More generally, the network interface 410 may include a combination of hardware and software suitable for coupling the components of the computing machine 405 to other computing or communications resources. By way of example and not limitation, this may include electronics for a wired or wireless Ethernet connection operating according to the IEEE 802.11 standard (or variation thereof), or other short or long range wireless networking components or the like. This may include hardware for short range data communications such as Bluetooth or an infrared transceiver, which may be used to couple to other local devices, or to connect to a local area network or the like that is in turn coupled to a data network 402 such as the Internet. This may also include hardware/software for a WiMAX connection or a cellular network connection (using, e.g., CDMA, GSM, LTE, or any other suitable protocol or combination of protocols). The network interface 410 may be included as part of the input/output interface 414 or vice-versa.

The data store 412 may be an internal memory store providing a computer-readable medium such as a disk drive, an optical drive, a magnetic drive, a flash drive, or other device capable of providing mass storage for the computing machine 405. The data store 412 may store computer readable instructions, data structures, program modules, and other data for the computing machine 405 or system 400 in a non-volatile form for relatively long-term, persistent storage and subsequent retrieval and use. For example, the data store 412 may store an operating system, application programs, program data, databases, files, and other program modules or other software objects and the like.

The input/output interface 414 may support input from and output to other devices that might couple to the computing machine 405. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 410 for network communications is described separately from the input/output interface 414 for local device communications, these two interfaces may be the same, or may share functionality, such as where a USB port is used to attach to a Wi-Fi accessory, or where an Ethernet connection is used to couple to a local network attached storage.

A peripheral 416 may include a device used to provide information to or receive information from the computing machine 405. This may include human input/output (I/O) devices such as a remote control, a keyboard, a mouse, a mouse pad, a track ball, a joystick, a microphone, a foot pedal, a touch screen, a scanner, or other device that might be employed to provide input to the computing machine 405. This may include a display, a speaker, a printer, a projector, a headset, or any other audiovisual device for presenting information. The peripheral 416 may include a digital signal processing device, an actuator, or other device to support control of or communication with other devices or components.

Other I/O devices suitable for use as a peripheral 416 include haptic devices, three-dimensional rendering systems, augmented-reality displays, and so forth. In one aspect, the peripheral 416 may serve as the network interface 410, such as with a USB device configured to provide communications via short range (e.g., Bluetooth, Wi-Fi, Infrared, RF, or the like) or long range (e.g., cellular data or WiMAX) communications protocols. In another aspect, the peripheral 416 may augment operation of the computing machine 405 with additional functions or features, such as a global positioning system (GPS) device, a security dongle, or other device. In another aspect, the peripheral 416 may include a storage device such as a flash card, a USB drive, or other solid-state device, or an optical drive, a magnetic drive, a disk drive, or other device or combination of devices suitable for bulk storage. More generally, a device or combination of devices suitable for use with the computing machine 405 may be used as a peripheral 416 as contemplated herein.

A controller 418 may serve to control motion or movement control of the computing machine 405. For example, the computing machine 405 may be implemented as a moving robot, in which the controller 418 may be responsible for monitoring and controlling all motion and movement functions of the computing machine 405. The controller 418 may be tasked with controlling motors, wheels, gears, arms or articulating limbs or digits associated with the motion or movement of the moving components of the computing machine. The controller may interface with the input/output interface 414 and the peripheral 416, where the peripheral 416 is a remote control capable of directing the movement of the computing machine.

An image capturing device 420 may include cameras, sensors, or other image data gathering devices for use in conjunction with the computing machine's 405 ability to capture and record image data relating to the environment. For example, the image capturing device 420 may include a 360-degree panoramic camera 422 suitable for capturing a 2D image of an unconstrained environment. The image capturing device 420 may further include depth sensing devices 424, such as such as stereo cameras, structured light cameras, time-of-flight cameras, or the like, providing the computing machine 405 with the ability to generate a depth map of the environment and, together with the 2D panoramic image, generate a saliency map detailing the individuals, gestures, and areas of interest within the environment. Image capturing device 420 may further include additional gaze detection devices such as optical trackers or the like. Alternatively, the depth sensing device 424 may be capable of detecting eye gaze using IR cameras and sensors, for example, as described above.

A knowledge base 426 may serve as the learning center for the computing machine 405 as described above. The knowledge base 426 may be in the form of an artificial intelligence system, deep neural network, semantic scene parsing system, simultaneous location and mapping system, computer vision system or the like. The knowledge base may interface with the input/output interface 414 or the network interface 410 to communicate with outside data sources over the network 402 for additional information related to the identification and association of unknown objects. The knowledge base 426 may serve as the basis for the identification and association of objects of interest located by the system using the environment image data. The knowledge base 426 may interface with the data store 412 or memory 408 to store and recall data related to identified objects known and unknown and attributes related to those objects.

Other hardware 428 may be incorporated into the computing machine 405 such as a co-processor, a digital signal processing system, a math co-processor, a graphics engine, a video driver, a microphone, or speakers. The other hardware 428 may include expanded input/output ports, extra memory, or additional drives (e.g., a disk drive or other accessory).

A bus 430 or combination of busses may serve as an electronic or electromechanical backbone for interconnecting components of the computing machine 405 such as the processor 406, memory 408, network interface 410, data store 412, input/output interface 414, controller 418, image capturing device 420, knowledge base 426, and other hardware 428. As shown in the figure, each of the components of the computing machine 405 may be interconnected using a system bus 430 in a communicating relationship for sharing controls, commands, data, or power.

Figure 5:
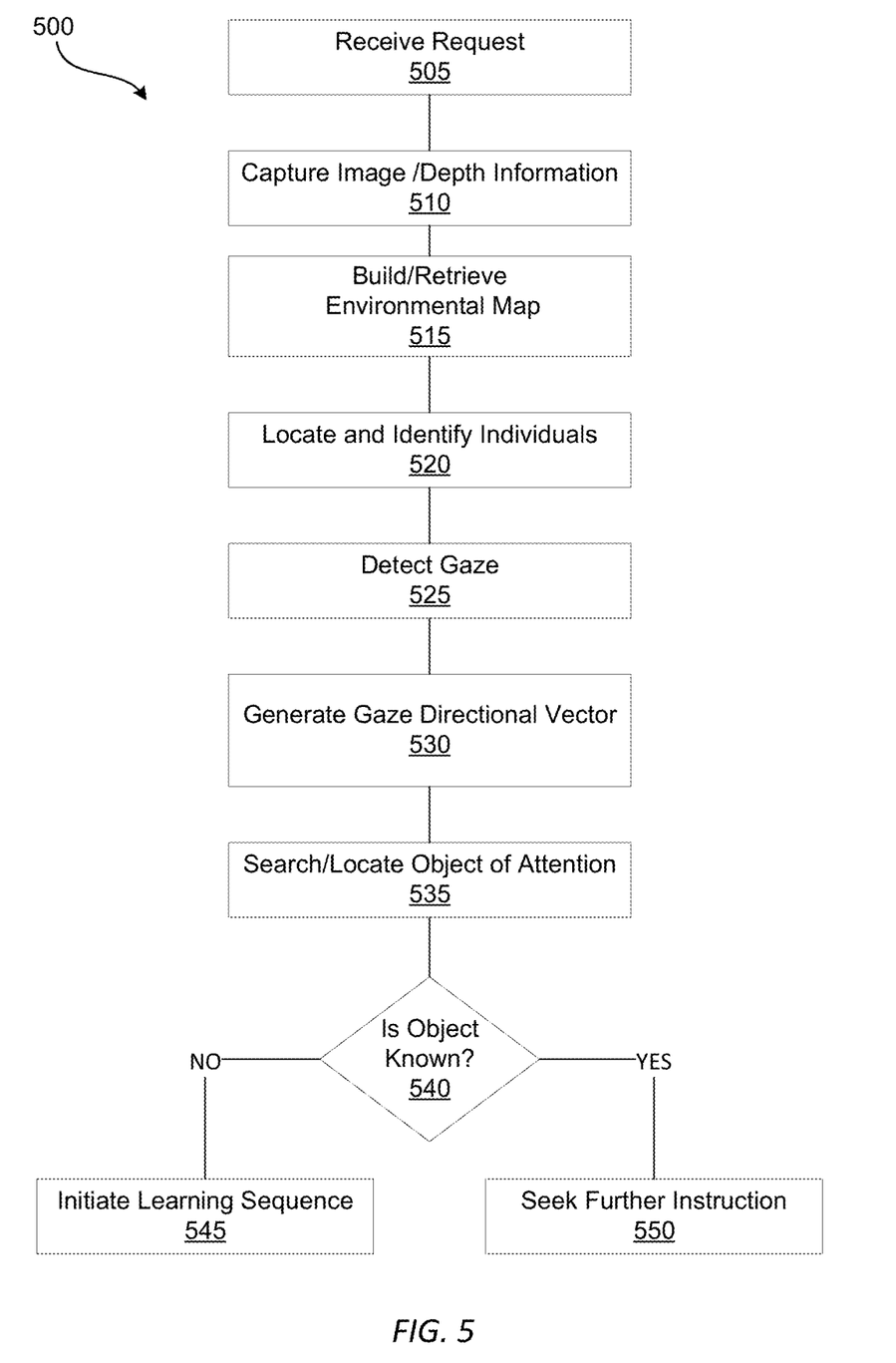
FIG. 5 is a flowchart of a method for locating and identifying an object using gaze and gesture detection according to an embodiment of the present disclosure.

Turning now to FIG. 5, a flowchart for a method 500 for locating and identifying an object using human gaze and gesture detection is shown according to an embodiment of the present disclosure. As detailed above, the systems described herein may use environment image data, human eye gaze information, and gesture information to locate and identify objects that are of interest to an individual. As shown in block 505, the system may receive a request to identify an object. For example, an individual may initiate a location and detection request by issuing a verbal command or a tactile command on a remote control or other interface in communication with the system.

The system may, upon receiving a request, verbal or otherwise, parse the request using natural language processing, learned behavior, or the like to further refine the location and identification process. As detailed above, the system may be trained or programmed with a library of commands, objects and affordances that can be used refine saliency maps and object location and detection. The language of the request may provide the system with additional contextual information that may allow the system to narrow its search area, or environment. For example, if a directing individual submits a request to "Locate an object on the table," and gaze towards a box on a table, the system may parse the request and identify a table as a narrower environment to which the system may search for an object. The system may know that a table has a raised flat surface on which objects may be placed. The system can then eliminate from its environment walls, floors, and other objects that do not share the known properties of a table. The library of known and learned commands, objects and affordances may provide a foundational knowledge base on which the system can begin its location and identification processes.

As shown in block 510, the system may capture image and depth information related to the unconstrained environment. The system may capture a 2D image of an unconstrained environment. The 2D environment image may be captured by a 360-degree panoramic camera, or may be a series of images, taken by one or more cameras, stitched together to form a 360-degree representation of the environment. The system may further capture a depth image. The depth image may be obtained using IR cameras, sensors or the like. Environment depth information may also be obtained using SLAM (e.g., for a moving robot system) or a deep neural network trained for depth estimation in unconstrained environments, such as indoor scenes. The depth information may be used to measure distances between the system, individuals, objects, and/or other definable contours of the environment, as detected by the system.

As shown in block 515, the system may build or retrieve an environment map. The environment map may be based on the 2D panoramic image and the depth sensing data obtained by the system. Alternatively, the environment map may be retrieved from system memory if the environment has been previously mapped, or uploaded to the system. The environment map may be generated as a saliency map detailing image and depth data into a representation of the environment that is meaningful and easier for the system to interpret. Alternatively, the environment map may be generated by a semantic parsing of the scene into objects and their identities (if known). The system may define areas of interest based on the distinguishing image data (e.g., identifying areas of distinguishing pixel or image data as compared to common or homogeneous pixel areas).

As shown in block 520, once the environment map is built or retrieved, the system may locate and identify individuals, as opposed to objects, and the individual's eye gaze. Bounding boxes may be generated around the heads and eyes of identified individuals. Within the bounding boxes, the individual's eye gaze may be detected using IR sensors, or other optical/head tracking devices to locate and track the movement of the individual's eye to form an estimated line-of-sight vector.

The system may, as shown in block 525, detect a gaze from an individual. Analysis of the environment map, and the identified individuals may result in the detection of the direction of gaze of a directing individual. The gaze may be detected using an RGB camera, IR sensors, or the like to determine the movement, and gazing direction of the individual's eye.

As shown in block 530, the system may then generate a directionality vector. Analysis of the individuals gaze and gesture may allow the system to project a directionality vector over the environment scene from the individual across the environment map in the estimated direction of the individuals gaze and gesture. The directionality vector may be extrapolated from the individual's gaze and gesture through the environment.

As shown in block 535, the system may search for and locate an object of attention based on the gaze and gesture of the individual. The system may analyze the extrapolated directionality vector to determine of the vector intersects with any objects or areas of interest identified in the saliency map. If the vector intersects with an area of interest in the saliency map, the system may determine the area of interest as an object of the individual's attention.

As shown in block 540, the system may determine if the object is known. Once the object of interest is located, the system may consult a knowledge base, such as a neural network, image database, or other source of data to compare the image data of the object with known objects with similarly associated image data.

If the object is known, as shown in block 550, the system may seek further instruction from the individual. For example, the system may produce an audible or visual indication that an object has been located and identified, and indicate the identity of the object. The system may then prompt the individual for further instructions regarding the object, or location and identification of another object. If the object is not known to the system, as shown in block 545, the system may initiate a learning process by which the system may be trained, with interaction from the individual, by recording the object's image data in the knowledge base and an associated identity provided by the individual. The image data and associated identity may be recalled the next time the system is called upon to identify an object with similar image data.

Figure 6:
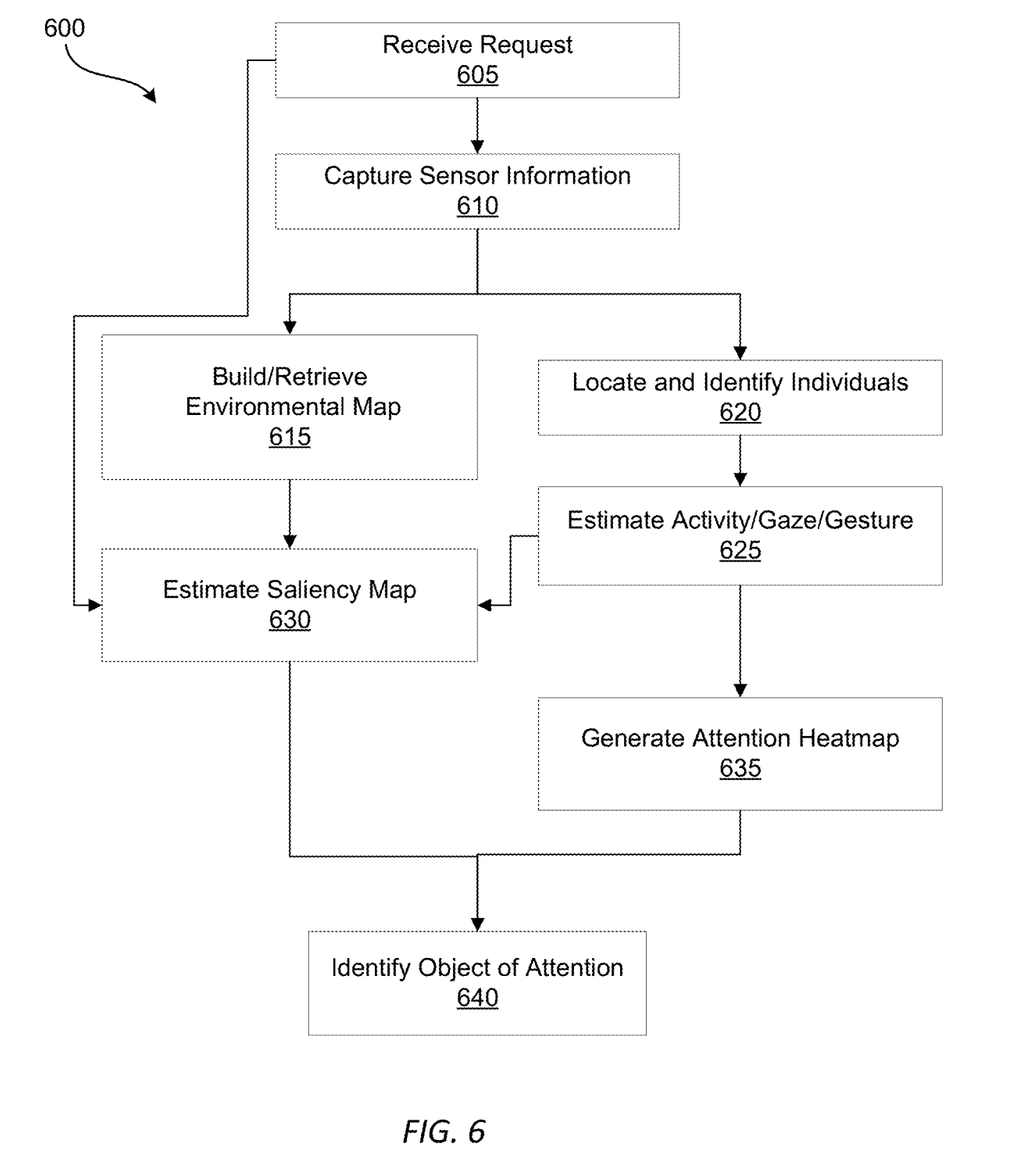
FIG. 6 is a further flow chart depicting refinement of the gaze determination according to an embodiment of the present disclosure.

Turning now to FIG. 6, a further flow chart depicts a refinement of the gaze determination according to an embodiment of the present disclosure. As shown in block 605, and previously described, the system may receive a request from a directing individual to locate and identify an object of interest. The request may be a verbal request, or may be initiated through a user-interface or other controller located on or remote from the system. The system, through programming or advanced machine learning techniques, may parse complex and contextually based requests in order to begin the search for and location of an object of interest. The request may further include additional instructions to be carried out once the object of interest is identified. The system may again rely on programming or advanced knowledge base to parse and execute the additional instructions.

As shown in block 610, and previously described, the system may capture sensor information related to the unconstrained environment. Sensor data may be obtained by an RGB camera, IR sensors or the like to capture the environment. As shown in block 615, the system may use the captured sensor information to build or retrieve an environment map. The system may compare some or all of the newly acquired sensor data to other environment maps the system may have stored in memory. If the environment is known to the system, a previously stored environment map may be retrieved. If, however, the environment is unknown to the system, the system may register the environment map in memory for use in subsequent operations.

As shown in block 620, and as described herein, the system may also locate and identify individuals within the environment, based on the captured sensor data. Pattern recognition, facial recognition or the like may be implemented to locate and identify the presence of individuals within the environment. If there is more than one individual in the environment, the system may implement additional processes to determine which of the individuals is the directing individual. In order to locate an object of the directing individual's attention and where that individual is gazing, the system may parse the data relating to the individuals to determine if one of the individuals is looking directly at the system, making a gesture, or possesses certain characteristics for which the system may be programmed to locate. For example, the directing individual may be holding a remote or other controller the system can identify, signifying that the carrier is the directing individual. If the system cannot identify the directing individual, the system may issue a prompt seeking further instructions.

As shown in block 625, the system may estimate the activities, gaze and/or gestures of the directing individual. As described above, the system may detect the eye gaze of the directing individual by scanning the eye activity and processing where the directing individual may be looking. Eye gaze detection and tracking may be supplemented by other observable information, giving the system additional contextual information on which to continue its analysis. For example, the system may observe to determine if the individual is involved in a particular activity, posture, or location that may further refine the environment in which the system is seeking the object of attention. Additionally, as previously described, the system may detect a gesture of the directing individual to provide additional information. These observations may form a set of parameters for the system to use to filter environment information into a narrower field of interest in order to locate the object of interest.

As shown in block 630, the environment map, including image and depth information, may be used to generate a saliency map. The saliency map may be generated using the techniques described above, including semantic scene parsing, or other image processing techniques. Additional information obtained by the system may assist in generating the saliency map. The observations of the individuals, in connection with block 625 may be used to further develop or limit the saliency map. If the directing individual is observed in such a way as to further refine the environment, the system may only concern itself with that limited area. For example, if the directing individual is gesturing towards a portion of the environment, the system may limit the saliency map to only that area of the environment.

Additionally, the system may be able to use contextual information and affordances extracted from the original request, at block 605, to further limit the environment. For example, if the request included identification of an area of the environment, such as a corner, or it included a contextual command to "open the window," the system may limit the environment and the saliency map to only objects on walls. In this manner, the system can generate a focus saliency map with a more limited universe of potential objects or areas of interest.

As shown in step 635, the system may generate an attention heat map based on the observed activities and gaze of the directing individual. The attention heat map may be generated by the system using a number of scans of the directing individual over a period of time. As described above, due to the natural movement of the eye and the propensity for a directing individual to gaze in multiple areas when issuing a request, the system may take a number of scans, and generate a heat map detailing the frequency and density of the locations of the directing individual's gaze. The areas of highest concentration of the directing individual's gaze may signify the area or direction to which the directing individual is directing her attention. While there may be several discrete gaze directions detected, an amalgamation of several eye gaze scans may provide a significantly higher number of scans directed towards the area in which the object of attention is located.

As shown in block 640, the attention heat map may be combined, overlaid, or overlapped with the saliency map to determine where the location of the object of interest. The system may determine the object of interest's location by determining the intersection of an area of interest on the saliency map with a concentrated area of detected gazes. If the system can determine such an intersection, then the system may have located the object of interest and may then move on to identify the object. As previously described, if the object of interest can be identified using any of the information the system has obtained in the process, the system may indicate as much. If the object is unknown to the system, a learning process may be initiated.

While embodiments of the system described herein include a moving robot detecting human eye gaze and gestures, one of skill in the art will recognize that the system is not limited solely to those robots and other types of computing machines, whether distributed or centralized, may be otherwise implemented without deviating from the scope of the disclosure.

Further, while the illustrative systems and methods described in the present disclosure implement a 360-degree panoramic camera to capture the 2D image of the unconstrained environment, one skilled in the art will recognize that other image capturing devices may be used. For example, an RGB camera, a rotating camera, or multiple cameras with overlapping fields-of-view may be used to capture a series of environment images that the system processor may stitch together to form a single 360-degree representation of the environment.

While embodiments of the present disclosure describe use of IR cameras, sensors and the like to generate depth map information, one of skill in the art will recognize that other depth sensing techniques may be used without deviating from the scope of the disclosure, including without limitation, SLAM or deep neural networks trained for depth estimation.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the description and following claims, it is understood that terms such as "first," "second," "third," "above," "below," and the like, are words of convenience and are not to be construed as limiting terms unless expressly stated otherwise.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A system for locating and identifying an object, the system comprising:
    a monocular camera configured to capture a 360-degree image of an unconstrained environment comprising an individual and an object of interest;
    an infrared depth sensor configured to generate a three-dimensional depth map of the unconstrained environment;
    a knowledge base; and
    a processor configured to:
        generate a saliency map from the 360-degree image and the depth map;
        determine a direction of attention from the individual;
        generate a three-dimensional directionality vector representative of the direction of attention;
        project the three-dimensional directionality vector from the individual on the saliency map;
        detect an intersection of the three-dimensional directionality vector with the object of interest; and
        search the knowledge base for an identity of the object of interest detected at the intersection of the directionality vector with the object of interest.

2. The system of claim 1, wherein the monocular camera is a panoramic camera.

3. The system of claim 1,
wherein the 360-degree image comprises a plurality of images stitched together.

4. The system of claim 1, wherein the three-dimensional depth map comprises a semantic parsing of the unconstrained environment.

5. The system of claim 1, wherein the processor is further configured to estimate a gesturing direction of the individual, wherein the direction of attention is determined from the gesturing direction.

6. The system of claim 1, wherein the processor is further configured to estimate an eye gaze and a gesturing direction of the individual, wherein the direction of attention is determined from the eye gaze and the gesturing direction.

7. The system of claim 1, wherein the environment depth information is obtained from a neutral network.

8. The system of claim 1,
wherein the processor is further configured to initiate a learning process when the identity of the object of interest is not found in the knowledge base.

9. The system of claim 8, wherein the learning process comprises a neural network.

10. The system of claim 1, further comprising wherein the processor is further configured to estimate an eye gaze of the individual, wherein the direction of attention is determined from the eye gaze.

11. The system of claim 10, wherein the eye gaze is estimated using infrared sensors.

* * * * *